(12) United States Patent
Rao et al.

(10) Patent No.: US 8,773,304 B2
(45) Date of Patent: Jul. 8, 2014

(54) METHOD AND APPARATUS TO IMPROVE SENSITIVITY OF DECODING TIME OF A GLOBAL NAVIGATION SATELLITE SYSTEM RECEIVER

(75) Inventors: Sandeep Rao, Bangalore (IN); Jaiganesh Balakrishnan, Bangalore (IN); Sthanunathan Ramakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 606 days.

(21) Appl. No.: 13/080,337

(22) Filed: Apr. 5, 2011

(65) Prior Publication Data

US 2012/0257651 A1  Oct. 11, 2012

(51) Int. Cl.
*G01S 19/24* (2010.01)
*G01S 19/21* (2010.01)
*G01S 19/35* (2010.01)

(52) U.S. Cl.
USPC ............. 342/357.63; 342/357.59; 342/357.75

(58) Field of Classification Search
CPC ......... G01S 19/21; G01S 19/22; G01S 19/24; G01S 19/243; G01S 19/246; G01S 19/35; G01S 19/36; G01S 19/37
USPC ............ 342/357.59, 357.61, 357.75–357.77, 342/357.63

See application file for complete search history.

(56) References Cited

U.S. PATENT DOCUMENTS

| | | | |
|---|---|---|---|
| 6,731,701 B2 * | 5/2004 | Vorobiev et al. | 375/342 |
| 7,720,104 B2 * | 5/2010 | Rao | 370/498 |
| 7,786,932 B2 * | 8/2010 | Syed et al. | 342/357.77 |
| 8,151,170 B2 * | 4/2012 | Lennen et al. | 714/777 |

* cited by examiner

*Primary Examiner* — Cassie Galt
(74) *Attorney, Agent, or Firm* — Ronald O. Neerings; Wade James Brady; Frederick J. Telecky, Jr.

(57) ABSTRACT

A method and an integrated circuit to improve sensitivity of decoding time of a GNSS receiver are disclosed. A plurality of estimates of states of an encoder for one or more instances of a time counter is maintained. A signal comprising a plurality of data bits corresponding to an instance of the time counter is detected and at least one augmented state for each estimate of states of the encoder is determined. A corresponding augmented state for successive instances of the time counter is predicted and an augmented branch metric for each of the at least one augmented state is computed. A path metric for the each estimate is updated based on the augmented branch metric for each of the at least one augmented state and a time counter value is determined based on the path metric for the each estimate.

20 Claims, 4 Drawing Sheets

METHOD AND APPARATUS TO IMPROVE SENSITIVITY OF DECODING TIME OF A GLOBAL NAVIGATION SATELLITE SYSTEM RECEIVER

TECHNICAL FIELD

Various implementations of the present disclosure are directed to satellite communication systems, and more particularly to improving sensitivity of decoding time of a global navigation satellite system (GNSS) receiver.

BACKGROUND

Global navigation satellite systems (GNSS) are broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS is being increasingly used for computing a user's positional information (e.g. a location, a speed, a direction of travel, etc.). Typically, a GNSS receiver tracks signals from multiple satellites in one or more satellite systems and uses information included in the signals to compute the positional information.

In order to compute the positional information, the GNSS receiver needs to know a position of each of the satellites it is tracking and a satellite time. A satellite signal transmitted by a satellite may be composed of ephemeris data, e.g., a set of values that provides the positions of an astronomical object at a given time, which may enable the GNSS receiver to know the position of the satellites it is tracking. The satellite signal also periodically transmits the current satellite time in the form of the time counter which increments by a fixed amount with every successive transmission. A periodicity of successive transmissions is 12 seconds for GPS L2-C signals and 30 seconds for Galileo signals. In the context of a GPS receiver, the time counter may be a time of the week (TOW) value, which is a time stamp that may be present in a time interval of the satellite signal that provides a seventeen-bit counter time value reset each week. In both GPS L2-C and Galileo signals, the time counter is convolutionally encoded prior to transmission. At low signal to noise ratios it may be difficult to reliably decode the value of the time counter using only one instance of the time counter.

Furthermore, at lower satellite signal powers the process of demodulation of the data becomes increasingly unreliable. This primarily affects the GNSS receiver operating in the Autonomous Cold Start mode at lower signal powers. The GNSS receiver must decode the convolutionally encoded time counter before it can compute the positional information. The process of decoding the time counter for obtaining the timestamp (current satellite time) is commonly referred to as "decoding time". Since the GNSS receiver cannot compute the positional information until the time counter is decoded, it is highly desirable that the GNSS receiver decodes the time as fast as possible even in constrained environments such as indoors where signals received from the GNSS satellites may be weak.

SUMMARY

An example of a method for improving sensitivity of decoding time of a global navigation satellite system (GNSS) receiver is disclosed. A GNSS receiver may be a satellite positioning system receiver. A plurality of estimates of states of an encoder for one or more instances of a time counter is maintained at the GNSS receiver. A signal comprising a plurality of data bits corresponding to an instance of the time counter is detected at the GNSS receiver. The signal may be a GNSS satellite signal received from a GNSS satellite. The plurality of data bits of the signal may represent convolutionally encoded outputs of the encoder for the instance of the time counter. At least one augmented state for each estimate of states of the encoder is determined. A corresponding augmented state for each of the at least one augmented state is predicted for successive instances of the time counter based on the at least one augmented state. An augmented branch metric for each of the at least one augmented state is computed by augmenting a branch metric for each of the at least one augmented state with corresponding branch metrics for corresponding augmented states. A path metric for the each estimate is updated based on the augmented branch metric for each of the at least one augmented state and a time counter value is determined based on the path metric for the each estimate. A positional information may be determined based on the determined time counter value.

In some aspects, a state traceback for the each estimate of the states of the encoder may be maintained. The corresponding augmented state may be predicted based on the determined at least one augmented state and a state trace back for an estimate of the plurality of estimates of the states of the encoder corresponding to the determined at least one augmented state. The branch metric for each of the at least one augmented state may be computed based on the at least one augmented state and the plurality of data bits of the signal. The branch metrics for corresponding augmented states may be computed based on the predicted corresponding augmented states for the successive instances of the time counter and a plurality of data bits of signals corresponding to the successive instances of the time counter.

In another aspect, a plurality of estimates of states of an encoder for one or more instances of a time counter is maintained at the GNSS receiver. A signal comprising a plurality of data bits corresponding to an instance of the time counter is detected at the GNSS receiver. At least one augmented state for each estimate of states of the encoder is determined. A corresponding augmented state for each of the at least one augmented state is predicted for instances of time counter of other signals based on the at least one augmented state. Each of the signal and the other signals may be a GNSS satellite signal. An augmented branch metric is computed for each of the at least one augmented state by augmenting a branch metric for each of the at least one augmented state with corresponding branch metrics for corresponding augmented states. A path metric for the each estimate of the states of the encoder is updated based on the augmented branch metric for each of the at least one augmented state and determining a time counter value based on the path metric for the each estimate of the states of the encoder. A positional information may be determined based on the determined time counter value.

In yet another aspect, an integrated circuit includes a time counter detector module configured to detect a signal comprising a plurality of data bits, and, a state estimator module configured to maintain a plurality of estimates of states of an encoder for one or more instances of a time counter and determine at least one augmented state for each estimate of the plurality of estimates of the states of the encoder for an instance of the time counter of the one or more instances of the time counter. The integrated circuit also includes a state predictor module configured to predict a corresponding augmented state for each of the at least one augmented state for successive instances of the time counter based on the at least one augmented state, and, a state transition module configured to compute an augmented branch metric for each of the at least one augmented state by augmenting a branch metric for each of the at least one augmented state with corresponding branch metrics for corresponding augmented states, wherein a path metric for the each estimate of the states of the encoder is computed by the state estimator module based on the augmented branch metric for each of the at least one augmented state. The integrated circuit further includes a decoding module configured to determine a time counter value based on the path metric for the each estimate of the states of the encoder.

The state estimator module may be configured to maintain a state traceback for the each estimate of the states of the encoder. The state predictor module may be configured to predict the corresponding augmented state based on the determined at least one augmented state and a state trace back for an estimate of the state of the encoder corresponding to the determined at least one augmented state. The integrated circuit may also include a processor configured to determine a positional information based on the determined time counter value.

The methods, systems, and apparatuses disclosed herein may be implemented in any means for achieving various aspects, and may be executed in the form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention. Furthermore, it will be clear that the invention is not limited to these embodiments only. Numerous modifications, changes, variations, substitutions and equivalents will be apparent to those skilled in the art without parting from the spirit and scope of the invention.

Figure 1:
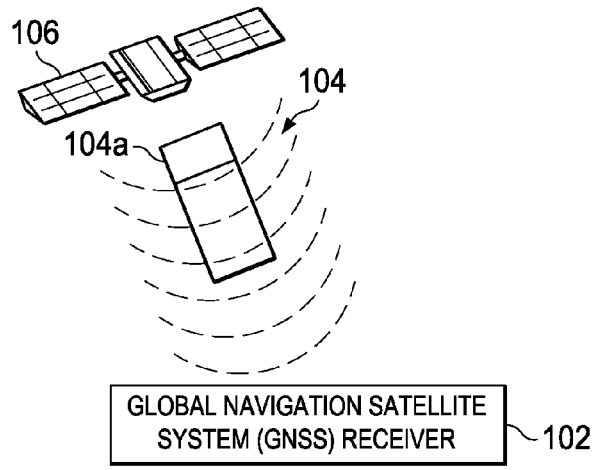
FIG. 1 is a system view of a global navigation satellite system (GNSS) receiver receiving a signal from a GNSS satellite, according to one embodiment.

FIG. 1 is a system view of a global navigation satellite system (GNSS) receiver receiving a signal from a GNSS satellite, according to one embodiment. More particularly, FIG. 1 illustrates a GNSS receiver 102 receiving a signal 104 including timing information 104a from a GNSS satellite 106. The GNSS satellite 106 may be a man-made earth orbiting device used for receiving and/or transmitting signals, which may include global positioning satellite signals, through transponders of the man-made earth orbiting device. Though FIG. 1 depicts the GNSS receiver 102 receiving the signal 104 from only one GNSS satellite, the GNSS receiver 102 may receive signals 104 from multiple satellites belonging to a satellite system, such as a global positioning system (GPS), a Global'naya Navigatsionnaya Sputnikovaya Sistema (GLONASS) satellite system, a Galileo satellite system and the like, and which are commonly referred to as GNSS.

In an embodiment, the signal 104 may include a navigation message modulated on top of ranging codes, such as a coarse/acquisition (C/A) code and an encrypted precision (P(Y)) code. The ranging codes may be used to measure the distance to the GNSS satellite 106 and the navigation message may provide the GNSS receiver 102 with the timing information 104a along with the satellite's status and an indication of operating status, orbital information called ephemeris data for enabling the GNSS receiver 102 to calculate the position of the GNSS satellite 106, and almanac information containing data and status concerning all satellites in a satellite system, their locations and their pseudorandom noise (PRN) numbers.

The timing information 104a may include the current satellite time information in form of a time counter, the value of which may be incremented by a fixed amount with every successive frame transmission (e.g., a periodicity of successive transmissions is 12 seconds for GPS L2-C signals and 30 seconds for Galileo signals). In both GPS L2-C and Galileo signals, the time counter is convolutionally encoded (e.g., a rate of ½ convolution code).

The GNSS receiver 102 receives the encoded time counter and needs to decode a time counter value to obtain the current satellite time information. The current satellite time information may then by utilized in conjunction with information, such as the ephemeris data, to compute positional information of the GNSS receiver 102.

Figure 2:
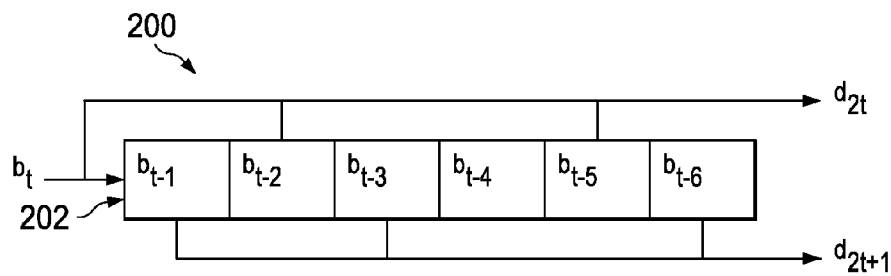
FIG. 2 depicts an example encoding of data bits corresponding to the signal at the GNSS satellite prior to transmission to the GNSS receiver, according to one embodiment.

FIG. 2 depicts an example encoding of data bits corresponding to the signal 104 at the GNSS satellite 106 prior to transmission to the GNSS receiver 102, according to one embodiment. More particularly, FIG. 2 depicts an example encoder 200 including a shift register 202 at the GNSS satellite 106. In FIG. 2, a constraint length of the encoder 200 is depicted to be seven, as depicted by the six (constraint length minus one) bits $b_{t-1}$ to $b_{t-6}$ of the shift register 202. However, the constraint length may be larger or smaller based on design preference. The constraint length of the shift register 202 may not be limited to any particular value and may be chosen to any suitable value for encoding the data bits corresponding to the signal 104. At each time t, a new bit ($b_t$) may enter the shift register 202 on the left and the oldest bit ($b_{t-6}$) in the shift register 202 may exit the shift register 202 on the right. At every stage t, and for each set of bits in the shift register 202, the encoder 200 may produce two output bits (e.g., $d_{2t}$ and $d_{2t+1}$) by convolutionally encoding the data bits in the shift register 202. The sequence of data bits output by the encoder 200 may be modulated and transmitted over the air to the GNSS receiver 102.

The data bits corresponding to the navigation message (including data bits corresponding to the timing information 104a in the form of the time counter) of the signal 104 may be serially input into the shift register 202 of the encoder 200 and for each bit, the encoder 200 may output two data bits. For the purposes of this description, a normal phase of operation of the encoder may be defined as a phase of operation where all of the data bits in the shift register 202 are data bits corresponding to the time counter and the other data bits corresponding to the navigation message have either exited the shift register 202 or are yet to be provided as input to the shift register 202. A state of the encoder 200 at time t may be defined as a set of bits present in shift register 202 at time t. Accordingly, in FIG. 2, the state of the encoder 200 may be [$b_{t-1}\ b_{t-2}\ b_{t-3}\ b_{t-4}\ b_{t-5}\ b_{t-6}$].

An instance of the time counter may be a time stamp, a value of which may increment by a fixed amount with every successive transmission. In an embodiment, the GNSS receiver 102 is a GPS receiver and the time counter value may be a time of the week (TOW) value. Each instance of the time counter in this embodiment is a time stamp that provides a seventeen-bit counter time value reset each week. Thus, if a particular instance has a TOW equal to N, the next instance would transmit a TOW of N+1, and so on. For each instance of the time counter, the data bits corresponding to the time counter value may be serially input into the shift register 202 and for each input of a data bit of the time counter, two bits corresponding to the state of the shift register 202 may be output for transmission to the GNSS receiver 102. The sequence of data bits output by the encoder 200 are modulated and transmitted over the air in form of the signal 104.

Figure 3:
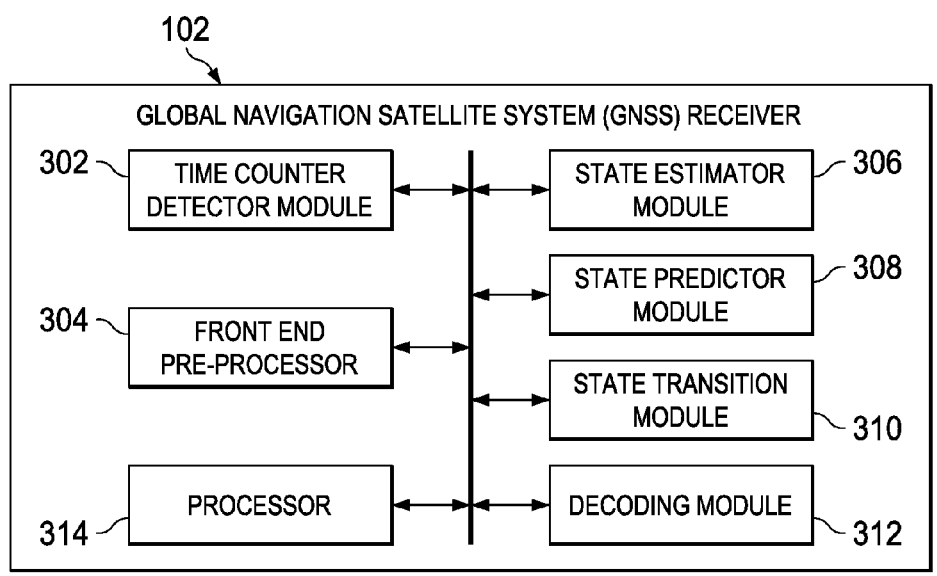
FIG. 3 is an exploded view of the GNSS receiver 102, according to one embodiment.

FIG. 3 is an exploded view of the GNSS receiver 102, according to one embodiment. Particularly, FIG. 3 illustrates internal circuitry of the GNSS receiver 102 in form of an integrated circuit including a time counter detector module 302, a front end pre-processor 304, a state estimator module 306, a state predictor module 308, a state transition module 310, a decoding module 312, and a processor 314, according to one embodiment.

The time counter detector module 302 may detect signals, such as signal 104, (e.g., that may be transmitted from satellites, such as the GNSS satellite 106) including a plurality of data bits corresponding to timing information 104a. The plurality of data bits may correspond to an instance of the time counter of the one or more instances of the time counter. The signal 104 may also include data bits corresponding to other information associated with the navigation message, such as ranging information, ephemeris data and almanac data. However, for the purposes of description and without loss due to generality, the plurality of the data bits may correspond to the timing information 104a in the form of the encoded time counter.

The signal 104 may be pre-processed by the front end pre-processor 304. The pre-processing may include down-converting the signal 104 to base band, correlating with the PN sequence to despread the signal 104 and then demodulating the signal 104. In addition, samples of the signal 104 may be quantized (e.g., converting the signal to a digital signal by taking the closest approximate DC value) to multiple levels that may yield a signal sample commonly referred to as a "soft decision value" or a "soft decision bit". The soft decision values corresponding to the plurality of data bits may be sent to the state estimator module 306.

The state estimator module 306 may be configured to maintain a plurality of estimates of states (such as a hypothesis of $2^{K-1}$ possible states of the shift register 200 during the encoding process, where K is the constraint length of the shift register 202) of the encoder 200 for the one or more instances of a time counter. More specifically, the state estimator module 306 may maintain a hypothesis for each state of the shift register 202. In FIG. 2, the shift register 202 is depicted to be a six bit register (constraint length k equal to seven). The state estimator module 306 may accordingly maintain $2^{K-1}$, or 64, estimates of possible states for each state of the shift register 202. The encoder 200 outputs two bits for each encoded state. In an embodiment, seventeen data bits corresponding to an instance of a time counter may accordingly pass through the shift register 202 and the convolutionally encoded outputs of the shift register 202 may be transmitted to the GNSS receiver 102 as the plurality of data bits. The state estimator module 306 may receive the plurality of data bits post pre-processing, and, based on an order of reception of the data bits, the state estimator module 306 may determine the estimate of states of the encoder 200 for the instance of the time counter from among the maintained estimates of the states of the encoder 200. More specifically, the state estimator module 306 may, based on the received plurality of data bits, determine various state transitions that the encoder 200 passed through, from among the maintained estimates of the states of the encoder 200.

In an example embodiment, the state estimator module 306 may, based on the received plurality of data bits, determine at least one augmented state for each estimate of the plurality of estimates of the states of the encoder 200 for the instance of the time counter. An augmented state may be defined to represent a state transition from one state to another. For example, for given estimates of the states of the encoder 200, $S_A=[b_{t-1}\ b_{t-2}\ b_{t-3}\ b_{t-4}\ b_{t-5}\ b_{t-6}]$ and $S_B=[b_t\ b_{t-1}\ b_{t-2}\ b_{t-3}\ b_{t-4}\ b_{t-5}]$, the augmented state may be defined to represent the state transition from $S_A$ to $S_B$. The augmented state for the state transition from $S_A$ to $S_B$ may be represented as [$b_t\ b_{t-1}\ b_{t-2}\ b_{t-3}\ b_{t-4}\ b_{t-5}\ b_{t-6}$]. For each estimate of the states of the encoder 200, the state estimator module 306 may define at least one augmented state. For example, the state estimator module 306 may define two augmented states for each estimate of the states of the encoder based on two likely prior states (prior bit being one of 1 or 0) that each estimate of the states of the encoder may transition from. The two augmented states may compactly represent (e.g. $b_t\ b_{t-1}\ b_{t-2}\ b_{t-3}\ b_{t-4}\ b_{t-5}\ b_{t-6}$) the state transitions from two likely prior states to the each estimate of the states of the encoder.

The state estimator module 306 may also maintain a state traceback and a path metric for each estimate of states of the encoder 200. The state traceback for each state may be a sequence of bits representing an optimal estimate of all prior bits of the time counter resulting into each state. For example, for the state of the shift register 202 depicted in FIG. 2, the state traceback may yield bits $b_{t-7}$ to $b_0$ data bits. For each state maintained by the state estimator module 306, a variable tr(s) may be defined which stores the traceback bits emanating from that state. A path metric for the each estimate of the states of the encoder 200 may be a metric representing a probability of the encoder 200 being in the each estimated state. The path metric may be suitably initialized during the start of the normal phase of operation and may be updated for each estimate of the states of the encoder 200 as the sequence of bits corresponding to the plurality of data bits are received.

It will be evident to a person skilled in the art that encoded instances of the time counter (e.g., N, N+1, N+2 . . . ) are transmitted one after the other interspersed with other navigation data. However, for the purposes of this application, and without loss due to generality, we can view M successive instances of time counter (e.g., TOW's) as being encoded in parallel and transmitted one after the other. With this view, given an augmented state of the encoder 1 (say $S_{1aug}$) at a specific instance in time, the corresponding augmented states of the remaining encoders (at the same instance in time) may be $S_{2aug} \ldots S_{Maug}$.

The state predictor module 308 may be configured to predict a corresponding augmented state for each of the at least one augmented state for successive instances of the time counter based on the at least one augmented state. In an embodiment, the state predictor module 308 may predict the corresponding augmented states of the encoder 200 for successive instances of the time counter based on the determined at least one augmented state and a state trace back for an estimate of the plurality of estimates of the states of the encoder 200 corresponding to the determined at least one augmented state. In an example embodiment, the state trace back corresponding to the determined at least one augmented state may be a state trace back corresponding to a originating state of the likely state transition represented by the determined at least one augmented state. For example, for a given estimate of the state of the encoder 200, $S_A$, and one of the at least one determined augmented states, $S_{A0} \rightarrow S_A$ (representing state transition from $S_{A0}$ to $S_A$) then, the state trace back of the originating state $S_{A0}$ may be provided along with the determined augmented state (i.e. bits representing the state transition from $S_{A0}$ to $S_A$) to the state predictor module 308 by the state estimator module for predicting corresponding augmented states to the determined augmented state. Similarly, corresponding augmented states may be predicted for each of the at least one augmented state by the state predictor module 308.

In an example embodiment, if the state traceback for an estimate of the state of the encoder corresponding to the determined at least one augmented state $S_{1aug}=[b_t \, b_{t-1} \, b_{t-2} \, b_{t-3} \, b_{t-4} \, b_{t-5} \, b_{t-6}]$ is $tr(S_1)=[b_{t-7} \, b_{t-8} \ldots b_0]$, then an estimate $(C_1)$ of the first t least significant bits (LSB) of the instance of the time counter may be obtained by concatenating the at least one augmented state with the corresponding state traceback. The estimate $(C_1)$ may be expressed as $$C_1 = [S_{1aug} tr(S_1)]$$

The state predictor module 308 may then compute first t LSBs of the subsequent M instances of the time counter as follows:

For i=2: M;

$$C_i = C_1 + 1;$$

where 'i' represents the sequence of the instance of the time counter among M successive instances of the time counter. More specifically, given an augmented state of encoder 200 and the t−6 prior bits that passed through the shift register 202, a corresponding augmented state of a successive instance of the time counter may be inferred by merely adding 1 to the binary representation of N to trivially compute the t LSBs of N+1 (given the property of the time counter to increment by a fixed amount, e.g. by one, in each successive instance).

For each computed $C_i$, the bits from t−6 to t (counting from LSB) form the augmented state $S_{1aug}$.

For i=2: M $$S_{iaug} = C_i [t-6: t]$$

Accordingly, the corresponding augmented states $(S_{2aug} \ldots S_{Maug})$ of the encoder 200 for the M successive instances of the time counter may be predicted by the state predictor module 308 based on the determined at least one augmented state and a maintained state traceback for the estimate of the state of the encoder 200 corresponding to the at least one augmented state.

The at least one augmented state and the corresponding augmented states may be provided along with the plurality of data bits to the state transition module 310 by the state predictor module 308. The state transition module 310 may compute a branch metric for each of the at least one augmented state (for example, $S_{1aug}$) of the encoder 200 based on the at least one augmented state and the plurality of data bits of the signal 104. More specifically, given an estimate of a state $S=[b_{t-1} \, b_{t-2} \, b_{t-3} \, b_{t-4} \, b_{t-5} \, b_{t-6}]$ and an incoming bit $b_t$, the state transition module 310 may define a branch metric $b_r$ for capturing a probability that the encoder 200 transitions from S at time t, to $S'=[b_t \, b_{t-1} \, b_{t-2} \, b_{t-3} \, b_{t-4} \, b_{t-5}]$ at time t+1. The branch metric $b_r$ may then be a function of the augmented state and the soft decision data at time t. Referring to FIG. 2, the branch metric $b_r$ may be a function of the augmented state at time t $(S_{aug}=[b_t \, b_{t-1} \, b_{t-2} \, b_{t-3} \, b_{t-4} \, b_{t-5} \, b_{t-6}])$ and the soft decision data at time t (namely $d_{2t+1}$ and $d_{2t}$) and may be expressed as $b_r (S_{aug}, d_{2t+1}, d_{2t})$. The various techniques for computation of a branch metric may be well known to a person skilled in the art and are not included herein for the sake of brevity of description.

The state transition module 310 may then compute the branch metrics corresponding to the predicted corresponding augmented states of the encoder 200 for the successive instances of the time counter based on corresponding augmented states of the encoder 200 for the successive instances of the time counter and a plurality of data bits of signals corresponding to the successive instances of the time counter. For example, if the predicted corresponding augmented state for the second instance of the time counter is $S_{2aug}$ and the corresponding soft decision data bits at time t are $d_{22t}$ and $d_{22t+1}$, then the branch metric $b_{r2}$ for corresponding augmented state of the encoder 200 for the second instance of the time counter may be expressed functionally as $$b_{r2} = b_r(S_{2aug}, d_{22t}, d_{22t+1})$$

Similarly, the branch metrics corresponding to each predicted corresponding augmented state of the encoder 200 for the M successive instances of the time counter may be computed.

The state transition module 310 may compute an augmented branch metric by augmenting the branch metric for each of the at least one augmented state for the instance of the time counter with branch metrics corresponding to the predicted corresponding augmented states for successive instances of the time counter as expressed below:

$$b_{raugmented} = b_{r1} + b_{r2} + \ldots b_{rM}$$

The augmented branch metric may be provided by the state transition module 310 to the state estimator module 306. The state estimator module 306 may update the path metric and the state trace back for the each estimate of the states of the encoder 200 based on the augmented branch metric. The path metric for each estimate of the states of the encoder may be updated as follows:

During the normal phase of operation, for a given state, e.g., $S_A=[b_t\ b_{t-1}\ b_{t-2}\ b_{t-3}\ b_{t-4}\ b_{t-5}]$, there may be two estimates $S_{A0}=[b_{t-1}\ b_{t-2}\ b_{t-3}\ b_{t-4}\ b_{t-5}\ 0]$ and $S_{A1}=[b_{t-1}\ b_{t-2}\ b_{t-3}\ b_{t-4}\ b_{t-5}\ 1]$ of a prior state of the encoder 200. The state estimator module 306 may determine which of the two estimates of prior states of the encoder 200 is most likely ($S_{A0}$ or $S_{A1}$). The determination of the likely prior state may be based on calculating a sum (for example, $sum_1$) of the path metric for $S_{A0}$ and the augmented branch metric for the transition from $S_{A0}$ to $S_A$, and a sum (for example, $sum_2$) of the path metric for $S_{A1}$ and the augmented branch metric for the transition from $S_{A1}$ to $S_A$. If $sum_1$ is greater than $sum_2$ then $S_{A0}$ is determined to be the likely prior state and the path metric for $S_A$ is updated to be the sum of the path metric for $S_{A0}$ and the augmented branch metric for the transition from $S_{A0}$ to $S_A$. Similarly if the $Sum_2$ is greater than the $sum_1$, then $S_{A1}$ is determined to be the likely prior state and the path metric for $S_A$ is updated to be the sum of the path metric for $S_{A1}$ and the branch metric for the transition from $S_{A1}$ to $S_A$. The updating of the path metric may be mathematically expressed as:

$$p(S_A)=\max\{[p(S_{A0})+b_r(S_{A0}\to S_A)], [p(S_{A1})+br(S_{A1}\to S_A)]\}$$

The state estimator module 306 may also update the state trace back for each estimate of the states of the encoder 200. The state estimator module 306 may initialize the state traceback for each state to zero at the start of the normal phase of operation. During the normal phase of operation, for a given state, e.g., $S_A=[b_t\ b_{t-1}\ b_{t-2}\ b_{t-3}\ b_{t-4}\ b_{t-5}]$, there may be two possible estimates of a prior state of the time counter, $S_{A0}=[b_{t-1}\ b_{t-2}\ b_{t-3}\ b_{t-4}\ b_{t-5}\ 0]$ and $S_{A1}=[b_{t-1}\ b_{t-2}\ b_{t-3}\ b_{t-4}\ b_{t-5}\ 1]$. The state estimator module 306 may determine which of the two possible estimate of prior states of the encoder 200 is most likely ($S_{A0}$ or $S_{A1}$) and update the state traceback for the state SA as follows:

$$tr(S_A)=[0\ tr(S_A)];\text{ if } S_{A0}\text{ is the likely prior state}$$

$$tr(S_A)=[1\ tr(S_A)];\text{ if } S_{A1}\text{ is the likely prior state}$$

After all of the plurality of data bits corresponding to the instance of the time counter are received, the decoding module 312 (e.g., a Viterbi decoder) may be configured to determine a time counter value based on the updated path metric for the each estimate of the possible states of the encoder 200. More specifically, the decoding module 312 may initiate a traceback from the state with the maximum path metric to determine the time counter value. The decoding module 312 may decode the time counter value as soon as the necessary gain is realised by combining successive instances of the time counter and may not need to combine subsequent instances of the time counter. The decoding module 312 may use various techniques known to a person skilled in the relevant arts to determine if the necessary gain has been realized such as looking at the value of the maximum path metric. Alternatively, a signal to noise ratio corresponding to the received soft decision bits may also be evaluated to estimate if sufficient gain has been realized.

Figure 4:
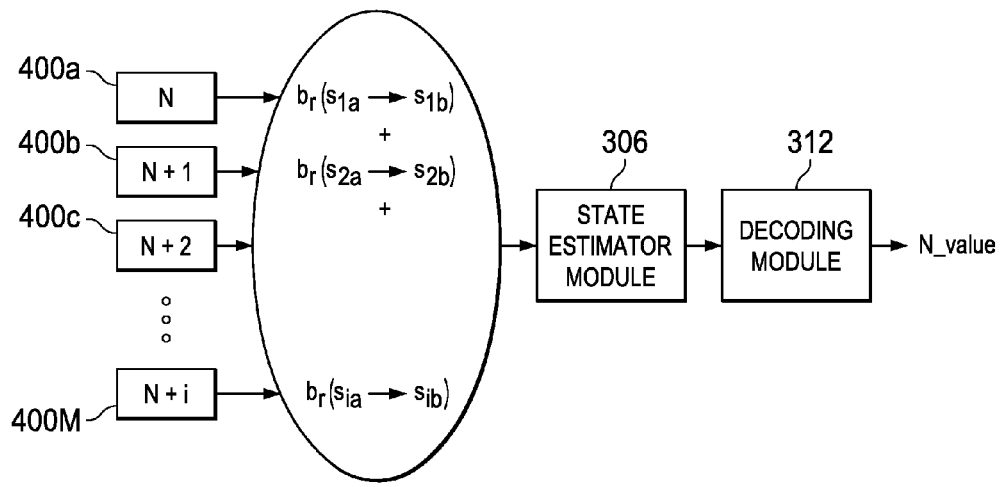
FIG. 4 is a simplified pictorial representation of augmenting of branch metrics corresponding to successive instances of the time counter for computing the augmented branch metric (for an augmented state of the at least one augmented state) for determining the time counter value, according to one embodiment.

Referring now to FIG. 4, a simplified pictorial representation of the augmenting of branch metrics corresponding to successive instances of the time counter for computing the augmented branch metric (for an augmented state of the at least one augmented state) for determining the time counter value, according to one embodiment. In FIG. 4, an estimate of a transition of state $s_{1a}$ to $s_{1b}$ for the current instance (N) of the time counter (depicted by block 400a) may be associated with a branch metric expressed as $b_r(S_{1a}\to S_{1b})$. The estimate of the transition of corresponding states for the successive instances of the time counter (N+1, N+2 ... N+i and depicted as blocks 400b, 400c and 400M, respectively) may be similarly associated with branch metrics denoted by $b_r(s_{2a}\to s_{2b})$, $b_r(s_{3a}\to s_{3b})$ ... $b_r(s_{ia}\to s_{ib})$. The branch metrics may be augmented, i.e. combined, for example, $b_r(s_{1a}\to s_{1b})+b_r(s_{2a}\to s_{2b})+b_r(s_{3a}\to s_{3b})+\ldots b_r(s_{ia}\to s_{ib})$, by the state transition module 308 and the augmented branch metric may be provided to the state estimator module 306 for updating the path metric and the state trace back corresponding to the each estimate of the plurality of estimates of the states of the encoder 200. It will be appreciated, that though FIG. 4 depicts the computation of the augmented branch metric for one augmented state, the augmented branch metric may be computed for each of the at least one augmented states and the path metric for each estimate of the states of the encoder 200 may be updated based on the augmented branch metric. The decoding module 312 may determine the time counter value (N_value) based on the path metric for the each estimate of the states of the encoder 200. In an embodiment, the decoding module 312 may decode the time counter value as soon as the necessary gain is realised by combining successive instances of the time counter and may not need to combine subsequent instances of the time counter.

Referring now to FIG. 3, the processor 314 may receive the time counter value from the decoding module 312. The processor 314 may decode the signal 104, i.e. compute positional information, based on the time counter value and other information included in the navigation message, such as the ephemeris and almanac data.

In an embodiment, the GNSS receiver 102 receives other signals in addition to the signal 104. For example, the signal 104 received from the GNSS satellite 106 may be a GPS signal and other signals may be signals from other satellite systems such as a GLONASS satellite system or a Galileo satellite system. However, each of the signal 104 and the other signals may be a GNSS signal. Each of the received signal 104 and the other signals may include an instance of the time counter. The time counter detector module 302 may detect the signals 104, as well as other signals. Each of the signal 104 and the other signals may include a plurality of data bits corresponding to timing information 104a. The signal 104 and the other signals may be pre-processed by the front end pre-processor 304. The soft decision values corresponding to the plurality of data bits may be sent to the state estimator module 306.

The state estimator module 306 may determine at least one augmented state for each estimate of the plurality of estimates of the states of the encoder 200 for the instance of the time counter. The state predictor module 308 may predict a corresponding augmented state for each of the at least one augmented state for instances of time counter of other signals based on the at least one augmented state. The state transition module 310 may compute an augmented branch metric for each of the at least one augmented state by augmenting a branch metric for each of the at least one augmented state with corresponding branch metrics for corresponding augmented states. The state estimator module 306 may update a path metric for the each estimate of the states of the encoder based on the augmented branch metric for each of the at least one augmented state. The decoding module 312 may determine a time counter value based on the augmented branch metric.

In an embodiment, the state predictor module 308 may predict the corresponding augmented state based on the determined at least one augmented state and a state trace back for an estimate of the state of the encoder corresponding to the determined at least one augmented state and a shared property between the detected signal 104 and the other signals. In an embodiment, the shared property between the detected signal 104 and the other signals may be a functional relation between instances of the time counter. A function y=f(x) may be defined on the set of non-zero integers as a shared property function if given t LSBs of the binary representation of x, the function f(x) can be used to compute at least the t LSBs of the binary representation of y.

In an embodiment, the functional relation between the detected signal and the other signals may not be limited to corresponding or successive instances of the time counter. For example, M instances of the time counter need not be M consecutive values of the counter N. They could instead be N, $f_1(N), f_2(N) \ldots f_{M-1}(N)$, where $f_1, f_2, \ldots f_{M-1}$ are all shared property functions. In an embodiment, the M instances of the time counter from the same or multiple signals may be encoded by different convolution codes (say C1, C2, ... CM).

In an example embodiment, the detected signal 104 is a Global Positioning Signal (GPS) satellite signal received from a satellite and the time counter value may be a time of week (TOW) value and the other signals may be global navigation satellite system (GNSS) satellite signals received from at least one of a Galileo satellite system and a Global'naya Navigatsionnaya Sputnikovaya Sistema (GLONASS) satellite system. In an embodiment, joint decoding of the signal and the other signals by the decoding module 312 (e.g., based on an augmented branch metric) may be performed for optimally decoding the time counter value using data from all the multiple GNSS signals available to the GNSS receiver 102, for example, by utilizing the functional relationship between TOW transmitted in Galileo and GPS signals of y=6*x (where y is the Galileo TOW, and x is the GPS TOW).

In an embodiment, joint decoding of the signals may be performed for legacy GPS L1C and the new GPS L2C signals which transmit the same TOW, the only difference being that the L1C signal is not channel coded, while the L2C signal is channel coded by optimally combining soft decision data from the GPS L1C and the GPS L2C signals to estimate TOW.

In an embodiment, the decoding of the successive instances of the time counter corresponding to signals from the GPS L2C signal (or the Galileo signal) may be considered as a special case of the shared property and may be expressed as $f_1(x)=x+1, f_2(x)=x+2, \ldots f_3(x)=x+M-1$. Thus, the joint decoding of the signals may not be restricted to current and successive instances of the time counter of one signal (e.g., N+1, N+2, N+3) but may be extended to current and successive instances of the time counter of the other signal (e.g., M, M+1, M+2, M+3). Moreover, the successive instances of the time counter need not be consecutive instances of the time counter (e.g. only N, and N+3 may be available).

Figure 5:
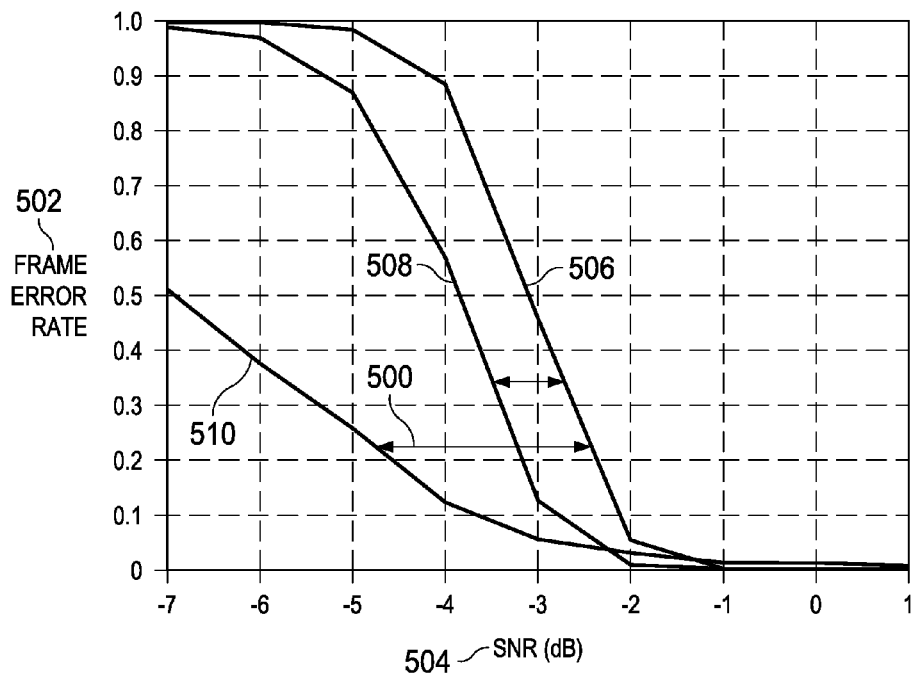
FIG. 5 is a graphical view illustrating performance improvement over previous systems, according to one embodiment.

FIG. 5 is a graphical view illustrating performance improvement over previous systems, according to one embodiment. Particularly, FIG. 5 illustrates a performance improvement 500, an X-axis representing signal to noise ratio (SNR) 502, and a Y-axis representing frame error rate 504, according to one embodiment. The SNR 502 may be a measure of signal strength relative to background noise and is measured in decibels (dB). The frame error rate 504 may be a measure of frames received with errors relative to the total frames received.

The performance improvement 500 illustrates the improvement in performance in terms of SNR (dB) 502 compared to previous systems. Previous systems may use techniques of decoding of the signal by decoding each instance of the time counter separately and without utilizing the fact that successive instances of the time counter share a property of incrementing by a fixed amount in successive transmissions. In FIG. 5, performance curves 506 and 508 represent previous system performance during decoding of each instance of the time counter separately using a decoder based on a classical Viterbi algorithm and a decoder based on soft output Viterbi algorithm (SOVA) variation of the classical Viterbi algorithm respectively. Performance curve 510 represents decoding of the time signal by computing an augmented branch metric (as explained in FIGS. 3 and 4) and determining the time counter value based on the updated path metric. The performance curves 504, 506 and 510 represent performances obtained over four successive instances of the time counter. As depicted in FIG. 5, the SOVA based decoding of the signal provides a 1 dB gain over decoding of the signal using classical Viterbi algorithm based decoder, and decoding the time signal by decoding based on augmented branch metric provides a several dB gain (e.g., a 3 dB gain) over the performance curve 506 (previous systems).

Figure 6:
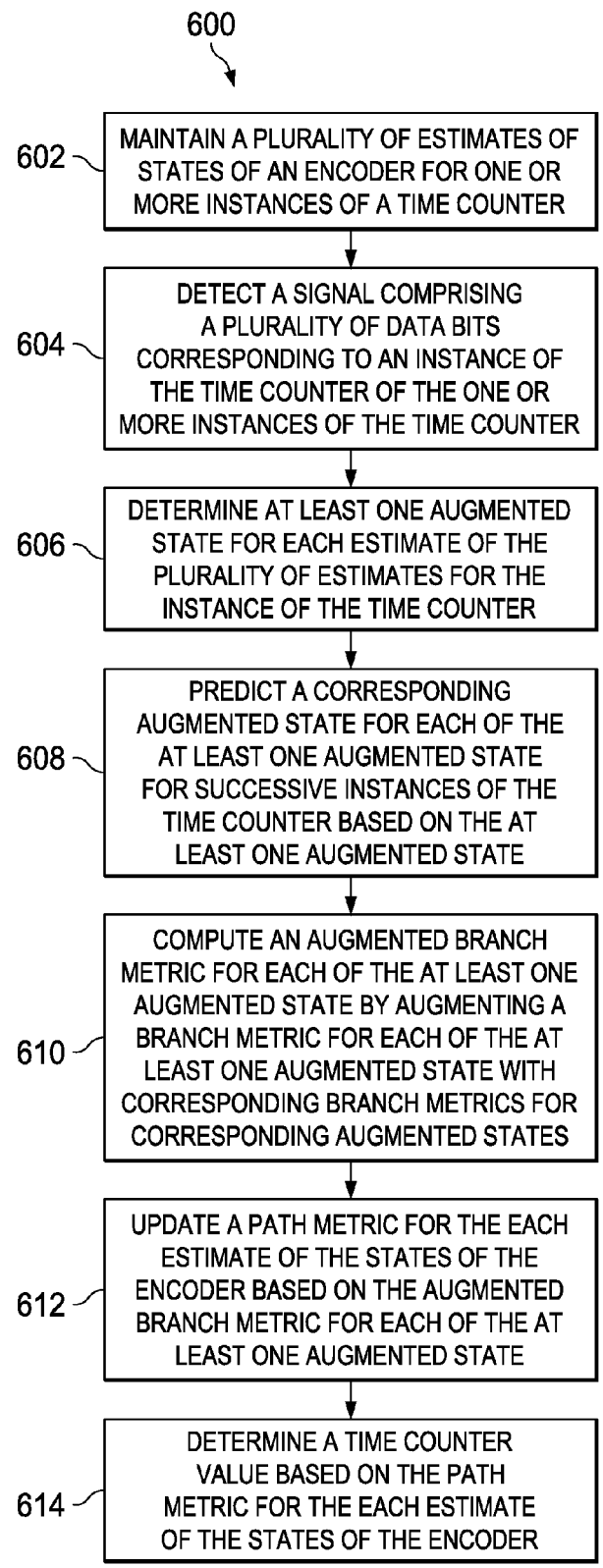
FIG. 6 is a process flow of decoding a signal including a plurality of data bits, according to one embodiment.

FIG. 6 is a process flow 600 of decoding a signal (e.g., a Global Positioning System (GPS) satellite signal) including a plurality of data bits (e.g., the global positioning signal composed of data bits), according to one embodiment. In operation 602, a plurality of estimates of states of an encoder (e.g., the encoder 200 of FIG. 2) for one or more instances is maintained (e.g., using the state estimator module 306 of FIG. 3).

In operation 604, a signal comprising a plurality of data bits corresponding to an instance of the time counter of the one or more instances of the time counter is detected (e.g., using the time counter detector module 302 of FIG. 3). In operation 606, at least one augmented state for each estimate of the plurality of estimates of the states of the encoder for the instance of the time counter is determined (e.g., using the state estimator module 306 of FIG. 3). In operation 608, a corresponding augmented state for each of the at least one augmented state for successive instances of the time counter is predicted (e.g., using the state predictor module 308 of FIG. 3) based on the at least one augmented state. In operation 610, an augmented branch metric is computed (e.g., using the state transition module 310 of FIG. 3) for each of the at least one augmented state by augmenting a branch metric for each of the at least one augmented state with corresponding branch metrics for corresponding augmented states. In operation 612, a path metric is updated (e.g., using the state estimator module 306 of FIG. 3) for the each estimate of the states of the encoder based on the augmented branch metric for each of the at least one augmented state. In operation 614, a time counter value is determined (e.g., using the decoding module 312 of FIG. 3) based on the path metric for the each estimate of the states of the encoder.

In an example embodiment, operations 604-612 may be performed for one or more instances of the time counter and the time counter value may be determined based on the path metrics for the each estimate of the states of the encoder as soon as the necessary gain is realised by combining the one or more instances of the time counter.

In an embodiment, a state traceback for the each estimate of the states of the encoder may be maintained (e.g., using the state estimator module 306). In an embodiment, the corresponding augmented state is predicted (e.g., using the state predictor module 306) based on the determined at least one augmented state and a state trace back for an estimate of the state of the encoder corresponding to the determined at least one augmented state.

In an embodiment, the branch metric for each of the at least one augmented state is computed (e.g., using the state transition module 308) based on the at least one augmented state and the plurality of data bits of the signal. In an embodiment, the branch metrics for corresponding augmented states are computed (e.g., using the state transition module 308) based on the predicted corresponding augmented states for the successive instances of the time counter and a plurality of data bits of signals corresponding to the successive instances of the time counter.

In an embodiment, positional information may be determined (e.g., using the processor 314) based on the determined time counter value. In an embodiment, the plurality of data bits of the signal represents convolutionally encoded outputs of encoder for the instance of the time counter. In an embodiment, the signal is a global navigation satellite system (GNSS) signal received from a GNSS satellite. In an example embodiment, the signal is a Global Positioning Signal (GPS) satellite signal received from a satellite and the time counter value is a time of week (TOW) value.

Figure 7:
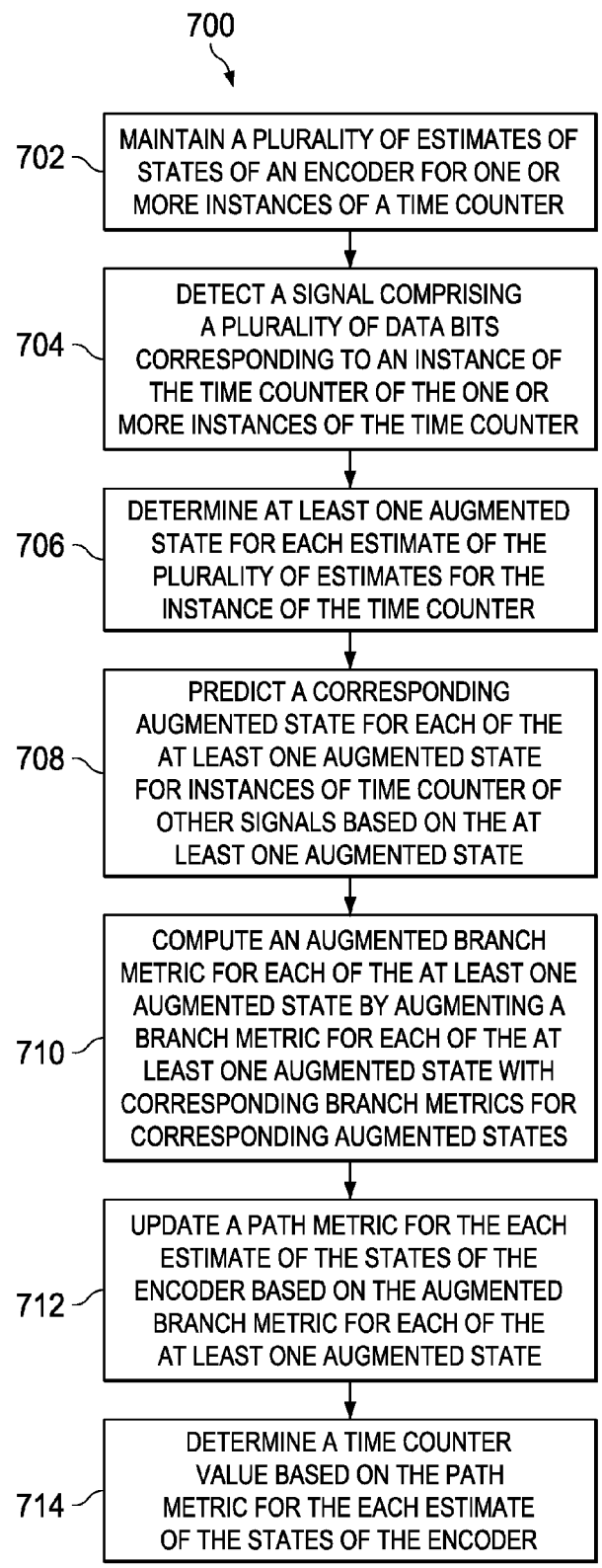
FIG. 7 is a process flow of decoding a signal including a plurality of data bits, according to another embodiment.

FIG. 7 is a process flow 700 of decoding a signal (e.g., a Global Positioning System (GPS) satellite signal) comprising a plurality of data bits (e.g., the global positioning signal composed of data bits), according to another embodiment. In operation 702, a plurality of estimates of states of an encoder (e.g., the encoder 200 of FIG. 2) for one or more instances is maintained (e.g., using the state estimator module 306 of FIG. 3).

In operation 704, a signal comprising a plurality of data bits corresponding to an instance of the time counter of the one or more instances of the time counter is detected (e.g., using the time counter detector module 302 of FIG. 3). In operation 706, at least one augmented state for each estimate of the plurality of estimates of the states of the encoder for the instance of the time counter is determined (e.g., using the state estimator module 306 of FIG. 3). In operation 708, a corresponding augmented state for each of the at least one augmented state for instances of time counter of other signals is predicted (e.g., using the state predictor module 308 of FIG. 3) based on the at least one augmented state. In operation 710, an augmented branch metric is computed (e.g., using the state transition module 310 of FIG. 3) for each of the at least one augmented state by augmenting a branch metric for each of the at least one augmented state with corresponding branch metrics for corresponding augmented states. In operation 712, a path metric is updated (e.g., using the state estimator module 306) for the each estimate of the states of the encoder based on the augmented branch metric for each of the at least one augmented state. In operation 714, a time counter value is determined (e.g., using the decoding module 312 of FIG. 3) based on the path metric for the each estimate of the states of the encoder.

In an example embodiment, operations 704-712 may be performed for one or more instances of the time counter and the time counter value may be determined based on the path metrics for the each estimate of the states of the encoder as soon as the necessary gain is realised by combining the one or more instances of the time counter.

In an embodiment, a state traceback for the each estimate of the states of the encoder may be maintained (e.g., using the state estimator module 306). In an embodiment, the corresponding augmented state is predicted (e.g., using the state predictor module 306) based on the determined at least one augmented state and a state trace back for an estimate of the state of the encoder corresponding to the determined at least one augmented state.

In an embodiment, the branch metric for each of the at least one augmented state is computed (e.g., using the state transition module 308) based on the at least one augmented state and the plurality of data bits of the signal. In an embodiment, the branch metrics for corresponding augmented states are computed (e.g., using the state transition module 308) based on the predicted corresponding augmented states for the successive instances of the time counter and a plurality of data bits of other signals.

In an embodiment, positional information may be determined (e.g., using the processor 314) based on the determined time counter value. In an embodiment, the plurality of data bits of the signal represents convolutionally encoded states of encoder for the instance of the time counter. In an embodiment, the signal is a global navigation satellite system (GNSS) signal received from a GNSS satellite. In an example embodiment, the signal is a Global Positioning Signal (GPS) satellite signal received from a satellite and the time counter value is a time of week (TOW) value.

Various embodiments disclosed herein and explained in conjunction with FIGS. 1 to 7 improve sensitivity of decoding time of a global navigation satellite system (GNSS) receiver at a low signal-to-noise ratio. The utilization of the incremental relationship between successive instances of a time counter for decoding the time counter value not only enables reliable decoding but also enables reliable demodulation of data at lower satellite signal powers. Moreover, for the GNSS receiver operating in the Autonomous Cold Start mode at lower signal powers, the satellite time information may be computed in faster even in constrained environments such as indoors where signals received from the GNSS satellites may be weak. Further, joint decoding of signals (such as GPS L1C and GPS L2C or Galileo signals and GPS signals) may also be performed to reliably decode the time counter value even in constrained environments.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

Particularly, the time counter detector module 302, the front end pre-processor 304, the state estimator module 306, the state predictor module 308, the state transition module 310, the decoding module 312, and/or the processor 314 of FIGS. 1-7 may be enabled using software and/or using transistors, logic gates, and electrical circuits (e.g., an integrated circuit circuitry such as application specific integrated ASIC circuitry) such as a the time counter detector circuit, a pre-processor circuit, a state estimator circuit, a state predictor circuit, a state transition circuit, a decoding circuit, and a processor circuit and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method, comprising:
   maintaining a plurality of estimates of states of an encoder for one or more instances of a time counter;
   detecting a signal comprising a plurality of data bits corresponding to an instance of the time counter of the one or more instances of the time counter;
   determining at least one augmented state for each estimate of the plurality of estimates for the instance of the time counter;
   predicting a corresponding augmented state for each of the at least one augmented state for successive instances of the time counter based on the at least one augmented state;
   computing in an integrated circuit apparatus an augmented branch metric for each of the at least one augmented state by augmenting a branch metric for each of the at least one augmented state with corresponding branch metrics for corresponding augmented states;
   updating a path metric for each of the estimates of the states of the encoder based on the augmented branch metric for each of the at least one augmented state; and
   determining a time counter value based on the path metric for each of the estimates of the states of the encoder.

2. The method of claim 1, further comprising:
   maintaining a state traceback for each of the estimates of the states of the encoder.

3. The method of claim 2, wherein the corresponding augmented state is predicted based on the determined at least one augmented state and a state trace back for an estimate of the plurality of estimates of states of the encoder corresponding to the determined at least one augmented state.

4. The method of claim 1, wherein the branch metric for each of the at least one augmented state is computed based on the at least one augmented state and the plurality of data bits of the signal.

5. The method of claim 4, further comprising:
   computing the branch metrics for corresponding augmented states based on the predicted corresponding augmented states for the successive instances of the time counter and a plurality of data bits of signals corresponding to the successive instances of the time counter.

6. The method of claim 1, further comprising:
   determining a positional information based on the determined time counter value.

7. The method of claim 1, wherein the plurality of data bits of the signal represent convolutionalty encoded outputs of the encoder for the instance of the time counter.

8. The method of claim 1, wherein the signal is a global navigation satellite signal (GNSS) satellite signal received from a GNSS satellite.

9. A method, comprising:
   maintaining a plurality of estimates of states of an encoder for one or more instances of a time counter;
   detecting a signal comprising a plurality of data bits corresponding to an instance of the time counter of the one or more instances of the time counter;
   determining at least one augmented state for each estimate of the plurality of estimates for the instance of the time counter;
   predicting a corresponding augmented state for each of the at least one augmented state for instances of the time counter of other signals based on the at least one augmented state;
   computing in an integrated circuit apparatus an augmented branch metric for each of the at least one augmented state by augmenting a branch metric for each of the at least one augmented state with corresponding branch metrics for corresponding augmented states;
   updating a path metric for each of the estimates of the states of the encoder based on the augmented branch metric for each of the at least one augmented state; and
   determining a time counter value based on the path metric for each of the estimates of the states of the encoder.

10. The method of claim 9, further comprising:
    maintaining a state traceback for each of the estimates of the states of the encoder, 11. The method of claim 10, wherein the corresponding augmented state is predicted based on the determined at least one augmented state and a state trace back for an estimate of the plurality of estimates of the states of the encoder corresponding to the determined at least one augmented state.

12. The method of claim 9, wherein the branch metric for each of the at least one augmented state is computed based on the at least one augmented state and the plurality of data bits of the signal.

13. The method of claim 9, further comprising:
    determining a positional information based on the determined time counter value, 14. The method of claim 9, wherein the plurality of data bits of the signal represent convolutionally encoded outputs of the encoder for the instance of the time counter.

15. The method of claim 9, wherein the signal is a Global Positioning Signal (GPS) satellite signal received from a satellite and wherein the time counter value is a time of week (TOW) value.

16. The method of claim 9, wherein each of the signal and the other signals is a GNSS satellite signal.

17. An integrated circuit, comprising:
    a time counter detector module configured to detect a signal comprising a plurality of data bits;
    a state estimator module configured to maintain a plurality of estimates of states of an encoder for one or more instances of a time counter and determine at least one augmented state for each estimate of the plurality of estimates for an instance of the time counter of the one or more instances of the time counter;
    a state predictor module configured to predict a corresponding augmented state for each of the at least one augmented state for successive instances of the time counter based on the at least one augmented state;
    a state transition module configured to compute an augmented branch metric for each of the at least one augmented state by augmenting a branch metric for each of the at least one augmented state with corresponding branch metrics for corresponding augmented states, wherein a path metric for each of the estimates of the states of the encoder is computed by the state estimator module based on the augmented branch metric for each of the at least one augmented state; and
    a decoding module configured to determine a time counter value based on the path metric for each of the estimates of the states of the encoder.

18. The integrated circuit of claim 17, wherein the state estimator module is configured to maintain a state traceback for each of the estimates of the states of the encoder.

19. The integrated circuit of claim 18, wherein the state predictor module is configured to predict the corresponding augmented state based on the determined at least one augmented state and a state trace back for an estimate of the plurality of estimates of the states of the encoder corresponding to the determined at least one augmented state.

20. The integrated circuit of claim 17, further comprising:
a processor configured to determine a positional information based on the determined time counter value.

* * * * *